United States Patent
Chatterjee et al.

(10) Patent No.: US 9,411,426 B2
(45) Date of Patent: Aug. 9, 2016

(54) EVALUATING ONSCREEN KEYBOARD

(71) Applicant: Tata Consultancy Services Limited, Mumbai (IN)

(72) Inventors: Debatri Chatterjee, Kolkata (IN); Arijit Sinharay, Kolkata (IN); Aniruddha Sinha, Kolkata (IN); Arpan Pal, Kolkata (IN)

(73) Assignee: Tata Consultancy Services Limited (IN)

( * ) Notice: Subject to any disclaimer, the term of this patent is extended or adjusted under 35 U.S.C. 154(b) by 122 days.

(21) Appl. No.: 14/312,100

(22) Filed: Jun. 23, 2014

(65) Prior Publication Data

US 2014/0375567 A1    Dec. 25, 2014

(30) Foreign Application Priority Data

Jun. 24, 2013  (IN) .......................... 2132/MUM/2013

(51) Int. Cl.
*G06F 3/02* (2006.01)
*G06F 11/34* (2006.01)
*A63F 13/00* (2014.01)

(52) U.S. Cl.
CPC . *G06F 3/02* (2013.01); *A63F 13/00* (2013.01); *G06F 11/3438* (2013.01)

(58) Field of Classification Search
CPC ..... G06F 19/363; G06F 3/0213; G06F 3/023; G06F 3/04895
USPC .................................................. 345/168, 173
See application file for complete search history.

(56) References Cited

U.S. PATENT DOCUMENTS

| | | | |
|---|---|---|---|
| 8,374,687 B2 | 2/2013 | Mathan et al. | |
| 2003/0032870 A1 | 2/2003 | Farwell | |
| 2005/0289561 A1* | 12/2005 | Torres et al. ............ | G06F 17/00 719/328 |
| 2006/0088154 A1 | 4/2006 | Mukhtar et al. | |
| 2011/0010646 A1* | 1/2011 | Usey ......................... | G06F 3/00 715/762 |
| 2011/0159467 A1* | 6/2011 | Peot et al. ............... | G09B 19/06 434/157 |
| 2012/0235912 A1 | 9/2012 | Laubach | |

* cited by examiner

*Primary Examiner* — Viet Pham
(74) *Attorney, Agent, or Firm* — Finnegan, Henderson, Farabow, Garrett & Dunner, LLP (57) ABSTRACT

Disclosed are methods and systems for evaluating onscreen keyboards. The method comprises receiving a first set of parameters and a second set of parameter associated with a first onscreen keyboard and a second onscreen keyboard, respectively. The method further comprises determining a first cognitive score for the first onscreen keyboard using the first set of parameters. The method further comprises determining a second cognitive score for the second onscreen keyboard using the second set of parameters. The method further comprises validating the first cognitive score and the second cognitive score using an Electroencephalography (EEG) signal of the user. The EEG signal of the user is captured while the user is using the first onscreen keyboard and the second onscreen keyboard.

16 Claims, 6 Drawing Sheets

EVALUATING ONSCREEN KEYBOARD

CROSS-REFERENCE TO RELATED PATENT APPLICATIONS

This U.S. patent application claims the benefit of priority under 35 U.S.C. §119 to India Patent Application No. 2132/MUM/2013, filed on Jun. 24, 2013. The aforementioned application is incorporated herein by reference in its entirety.

TECHNICAL FIELD

The present subject matter described herein, in general, relates to onscreen keyboards, and more particularly to systems and methods for evaluating onscreen keyboards displayed on display screens.

BACKGROUND

In the modern era of smart display devices such as, smart televisions capable of being coupled to a modem or other electronic devices for Internet and for other activities, people tend to use the smart display devices for a variety of purposes such as, surfing Internet and play games. In order to surf Internet or play games or to perform other activities on the smart display devices, one needs an onscreen keyboard to be displayed on the smart display devices. In other words, with these new evolving functionalities there is an increased need to enable its users to input text through onscreen keyboards and remote control devices.

As may be understood, a variety of onscreen keyboards with varied arrangements of alphabets, numbers, and characters are available. However, an onscreen keyboard that is most comfortable and user friendly to the users may be presented. Therefore, there is a need to evaluate onscreen keyboards before presenting the same to the users as existing onscreen layouts are not comfortable options to use in TV.

SUMMARY

This summary is provided to introduce concepts related to systems and methods for evaluating onscreen keyboards and the concepts are further described below in the detailed description. This summary is not intended to identify essential features of the claimed subject matter nor is it intended for use in determining or limiting the scope of the claimed subject matter.

In one embodiment, a method for evaluating onscreen keyboards is disclosed. The method comprises receiving a first set of parameters from a user using a first onscreen keyboard. The first set of parameters is indicative of a usability of the first onscreen keyboard. The method further comprises receiving a second set of parameters from the user using a second onscreen keyboard. The second set of parameters is indicative of a usability of the second onscreen keyboard. The method further comprises determining a first cognitive score for the first onscreen keyboard using the first set of parameters. The method further comprises determining a second cognitive score for the second onscreen keyboard using the second set of parameters. The method further comprises validating the first cognitive score and the second cognitive score using an Electroencephalography (EEG) signal of the user. The EEG signal of the user is captured while the user is using the first onscreen keyboard and the second onscreen keyboard.

In another embodiment, a system for evaluating onscreen keyboards is disclosed. The system comprises one or more processors and one or more memory units storing machine readable instructions executable by the one or more processors. The instructions may be executable by the one or more processors for receiving a first set of parameters from a user using a first onscreen keyboard, wherein the first set of parameters is indicative of a usability of the first onscreen keyboard; and receiving a second set of parameters from the user using a second onscreen keyboard, wherein the second set of parameters is indicative of a usability of the second onscreen keyboard. Additionally, the instructions may be executable by the one or more processors for determining, using the first set of parameters, a first cognitive score for the first onscreen keyboard; and determining, using the second set of parameters, a second cognitive score associated with the second onscreen keyboard. Furthermore, the instructions may be executable by the one or more processors for validating, using an Electroencephalography (EEG) signal of the user, the first cognitive score and the second cognitive score, wherein the EEG signal of the user is captured while the user is using the first onscreen keyboard and the second onscreen keyboard.

In yet another embodiment, a non-transitory computer readable medium storing machine readable instructions executable by one or more processors is disclosed. The machine readable instructions may be executed by the one or more processors for receiving a first set of parameters from a user using a first onscreen keyboard, wherein the first set of parameters is indicative of a usability of the first onscreen keyboard; and receiving a second set of parameters from the user using a second onscreen keyboard, wherein the second set of parameters is indicative of a usability of the second onscreen keyboard. Additionally, the machine readable instructions may be executed by the one or more processors for determining, using the first set of parameters, a first cognitive score for the first onscreen keyboard; and determining, using the second set of parameters, a second cognitive score associated with the second onscreen keyboard. Furthermore, the machine readable instructions may be executed by the one or more processors for validating, using an Electroencephalography (EEG) signal of the user, the first cognitive score and the second cognitive score, wherein the EEG signal of the user is captured while the user is using the first onscreen keyboard and the second onscreen keyboard.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

The present subject matter relates generally to evaluation of onscreen keyboards by determining cognitive scores associated with each of the two onscreen keyboards. The onscreen keyboards may be displayed on a display screen such as, a television, a computer, a point of sale screen, and a tablet computer. Evaluating an onscreen keyboard means determining whether a layout of the onscreen keyboard is comfortable enough for users or not. The onscreen keyboard may be evaluated by determining the cognitive scores associated with them. The cognitive scores may be determined based upon a set of parameters associated with the usability of the onscreen keyboards. The set of parameters may be associated with a Keystroke Level Model-Goals, Operators, Methods, and Selection (KLM-GOMS) model. The KLM-GOMS model assist in determining theoretical values of the cognitive scores.

After the theoretical values of the cognitive scores are determined using the KLS-GOMS model, an EEG signal of the user may be used to validate the cognitive scores so determined. It may be understood that the onscreen keyboards may be evaluated in two scenarios. In a first scenario, the onscreen keyboards to be evaluated will not be assisted with predictive text entry, whereas in a second scenario, the onscreen keyboards to be evaluated will be assisted with predictive text entry.

In the first scenario, the cognitive scores associated with the onscreen keyboards are determined using KLM-GOMS model and are validated using the EEG signal. After the cognitive scores are validated, it may ascertained whether to use the onscreen keyboard or not. More is the cognitive score, more will be the cognitive load, and more uncomfortable the onscreen keyboard will be to use. Therefore, after determining cognitive scores for several onscreen keyboard, one may choose to use an onscreen keyboard with least cognitive score.

In the second scenario, the cognitive scores associated with the onscreen keyboards are determined using KLM-GOMS model and are validated using the EEG signal. After the cognitive scores are validated, it may ascertained whether to use the onscreen keyboard or not. More is the cognitive score, more will be the cognitive load, and more uncomfortable the onscreen keyboard will be to use. Therefore, after determining cognitive scores for several onscreen keyboard, one may choose to use an onscreen keyboard with least cognitive score. Having said that, in the second scenario, a new parameter called a dynamic mental operator may also be determined for assisting in the evaluation of the onscreen keyboard. The dynamic mental operator is indicative of a cognitive load on the user while the user is assisted with predictive text entry on the onscreen keyboard. In other words, since the dynamic mental operator indicates an amount of cognitive load which is directly proportional to non-comfort-ness of the user of the onscreen keyboard.

Therefore, it may be understood that the several onscreen keyboard layouts may be evaluated by using the method and system proposed in the present subject matter. For example, onscreen keyboard layouts having several arrangements of alphabets, characters, and numerals may be evaluated for determining a comfort of the users for one or more of those onscreen keyboard layouts. Based upon the comfort of a user for any particular onscreen keyboard, such a keyboard may be chosen to be displayed on a display screen of the user for his use.

While aspects of described system and method for evaluating two onscreen keyboards by determining cognitive scores associated with each of the two onscreen keyboards may be implemented in any number of different computing systems, environments, and/or configurations, the embodiments are described in the context of the following exemplary system.

Figure 1:
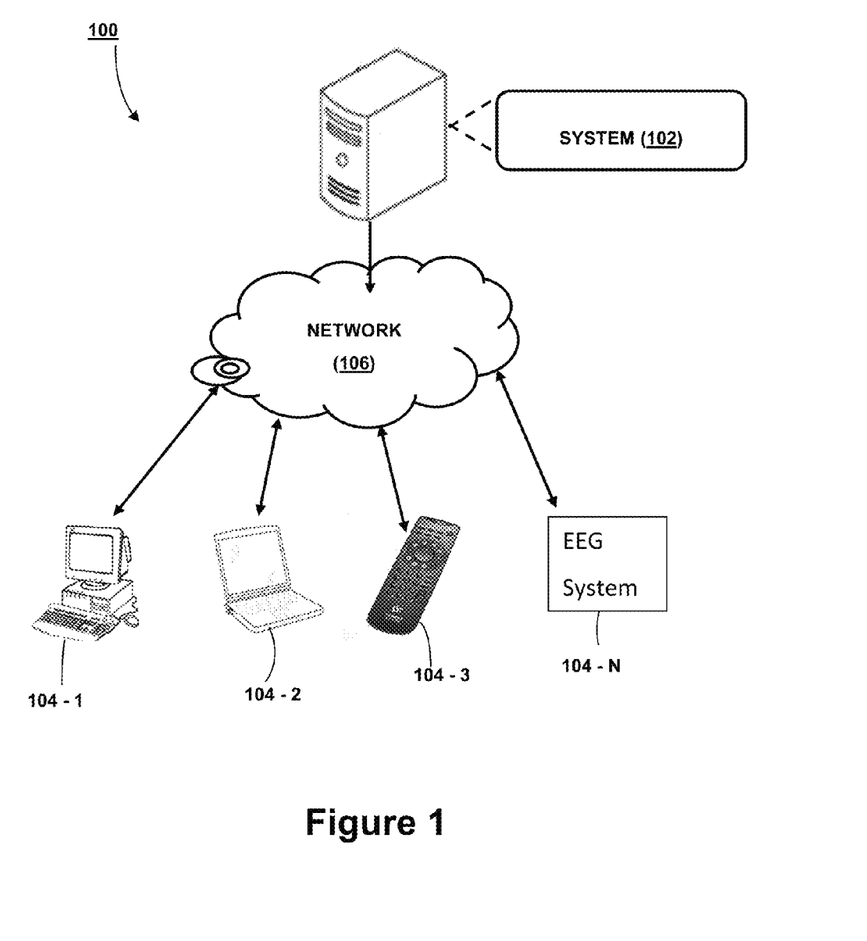
FIG. 1 illustrates a network implementation of a system for evaluating two onscreen keyboards to determine cognitive scores associated with each of the two onscreen keyboards, in accordance with an embodiment of the present subject matter.

Referring now to FIG. 1, a network implementation 100 of a system 102 for evaluating two onscreen keyboards by determining cognitive scores associated with each of the two onscreen keyboards is illustrated, in accordance with an embodiment of the present subject matter. In one embodiment, the system 102 receives a first set of parameters from a user using a first onscreen keyboard; and a second set of parameters from the user using a second onscreen keyboard. The first set of parameters is indicative of a usability of the first onscreen keyboard, whereas the second set of parameters is indicative of a usability of the second onscreen keyboard. Based upon the first set of parameters, the system 102 may determine a first cognitive score for the first onscreen keyboard. Subsequently, the system 102 may determine a second cognitive score for the second onscreen keyboard. After the cognitive scores are determined the, the system 102 may validate the first cognitive score and the second cognitive score using an Electroencephalography (EEG) signal of the user. The EEG signal of the user is captured while the user is using the first onscreen keyboard and the second onscreen keyboard.

It may be understood that after the cognitive scores are validated, the user may take an informed decision whether to use the first onscreen keyboard or the second onscreen keyboard.

Although the present subject matter is explained considering that the system 102 is implemented as a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, an EEG system, a workstation, and remote such as, a television remote. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
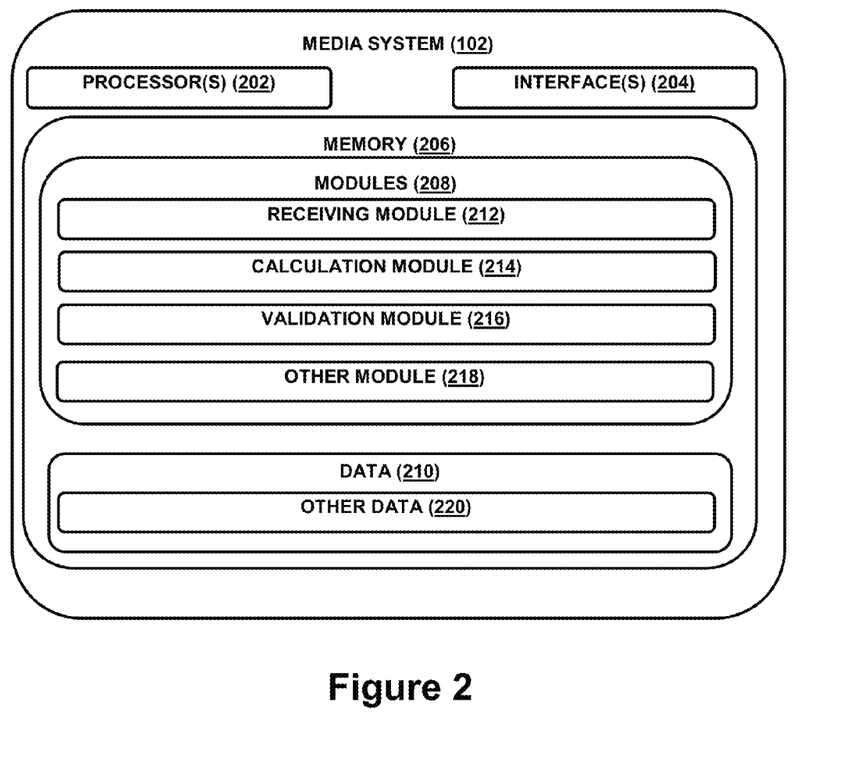
FIG. 2 illustrates the system of FIG. 1, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions.

Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 212, a calculation module 214, a validation module 216, and other modules 218. The other modules 218 may include programs or coded instructions that supplement applications and functions of the system 102.

The data 210, amongst other things, serves as a repository for storing data processed, received, and generated by one or more of the modules 208. The data 210 may also include and other data 220. The other data 220 may include data generated as a result of the execution of one or more modules in the other module 218.

In one implementation, at first, a user may use the user device 104 to access the system 102 via the I/O interface 204. The user may register themselves using the I/O interface 204 in order to use the system 102. The system 102 may be used for evaluating onscreen keyboards. The onscreen keyboards are the keyboards that may be displayed on a display screen such as, a television, a computer, a point of sale screen, and a tablet computer. The onscreen keyboards may be accessed using wireless remotes.

Evaluating an onscreen keyboard means determining whether a layout of the onscreen keyboard is comfortable enough for users or not. The layout of the onscreen keyboard may be understood as an arrangement of alphabets, characters, numbers, and the like in form of a keyboard displayed on a display screen such as a television. For example, a QWERTY keyboard may be understood as a layout of an onscreen keyboard. Similarly, English alphabets arranged in a sequence order may also be understood as a layout of an onscreen keyboard.

In the subsequent description, evaluation of two onscreen keyboards may be explained in detail. However, it may be understood that an underlined concept to evaluate an onscreen keyboard may be extended to any number of onscreen keyboards.

The Receiving Module 212

In order to evaluate two onscreen keyboards, at first, the user may capture a first set of parameters associated with a first onscreen keyboard; and a second set of parameters associated with a second onscreen keyboard. The first set of parameters and the second set of parameters are indicative of a usability of the first onscreen keyboard and the second onscreen keyboard, respectively. In one example, first set of parameters and the second set of parameters may be modified versions of original parameters used in a Keystroke Level Model-Goals, Operators, Methods, and Selection (KLM-GOMS) model. Specifically, a pointing parameter P of the KLM-GOMS model may be redefined. According to an embodiment of the present subject matter, the pointing parameter P may be redefined to indicate a sum of a time required to locate a key on the onscreen keyboard and a time required to move a focus on the key on the onscreen keyboard using a wireless remote. Therefore, it may be understood that each of the first set of parameters and the second set of parameters may include all parameters of the KLG-GOMS model except that the pointing parameter P is redefined. Table 1 shows all the parameters present in the first set of parameters and the second set of parameters.

In one example, in order to estimate the values of the pointing parameter P for first onscreen keyboard and the second onscreen keyboard, a user study was conducted on a group of 20 people. During the user study, a tape recorded message consisting of 25 randomly selected alphabets was played. The users were instructed to focus on a particular block containing alphabets. A time taken to finish such as exercise was noted using a stop watch. To reduce an error as much as possible, an average value was taken for each user. The point parameter P for a NON-QWERTY keyboard layout (the first onscreen keyboard) was found to be 1.77 second and the pointing parameter for a QWERTY keyboard layout (the second onscreen keyboard) was found to be 2.1 seconds. It may be understood that the users may be a mix batch of computer users and non-computer users.

The first set of parameters and the second set of parameters that may be used to ascertain the usability of the first onscreen keyboard and second onscreen keyboard are shown in Table 1 below:

TABLE 1

The parameters present in the first set of parameters and the second set of parameters:

| Parameters | Description | Time in sec for the first onscreen keyboard | Time in sec for the second onscreen keyboard |
|---|---|---|---|
| P | Time required to find a key and move focus on that key | 1.77 | 2.1 |
| K | Key or button press | 0.20 | 0.20 |
| H | Move from mouse to keyboard and back | 0.4 | 0.4 |
| R(t) | Waiting time for device to respond | t | t |
| M | Mental preparation and thinking time | 1.35 | 1.35 |
| F | Finger movement | 0.22 | 0.22 |

The first set of parameters and the second set of parameters after being captured by the user may be sent to the system 102.

The receiving module 212 of the system 102 may receive the first set of parameters and the second set of parameters.

The Calculation Module 214

Based upon the first set of parameters, the calculation module 214 may determine a first cognitive score for the first onscreen keyboard. Similarly, based upon the second set of parameters, the calculation module 214 may determine a second cognitive score for the second onscreen keyboard. Specifically, the calculation module 214 may add up time, shown in Column 3 of Table 1, corresponding to each parameter of the first set of parameters to determine the first cognitive score. Similarly, the calculation module 214 may add up time, shown in Column 4 of Table 1, corresponding to each parameter of the second set of parameters to determine the second cognitive score.

Based upon the first cognitive score, the calculation module 214 may determine a first cognitive load. Similarly, based upon the second cognitive score, the calculation module 214 may determine a second cognitive load. A term cognitive load is used in cognitive psychology to illustrate the load related to executive control of working memory. Theories contend that during complex learning activities an amount of information and interactions that must be processed simultaneously can either under-load or over load a finite amount of working memory one possesses.

The Validation Module 216

After the determining the first cognitive score and the second cognitive score, these score may be validated by the validation module 216. The validation module 216 uses EEG signal of the user, while the user is using the first onscreen keyboard and the second onscreen keyboard, to validate the first cognitive score and the second cognitive score. Specifically, the validation module 216 determines a first validation score associated the first onscreen keyboard by capturing the EEG signal while the user is using the first onscreen keyboard. Subsequently, the validation module 216 compares the first validation score with the first cognitive score to determine whether the first cognitive score is same as the first validation score, thereby validating the first cognitive score.

Similarly, the validation module 216 determines a second validation score associated the second onscreen keyboard by capturing the EEG signal while the user is using the second onscreen keyboard without predictive text entry. Subsequently, the validation module 216 compares the second validation score with the second cognitive score to determine whether the second cognitive score is same as the second validation score, thereby validating the second cognitive score.

Figure 3:
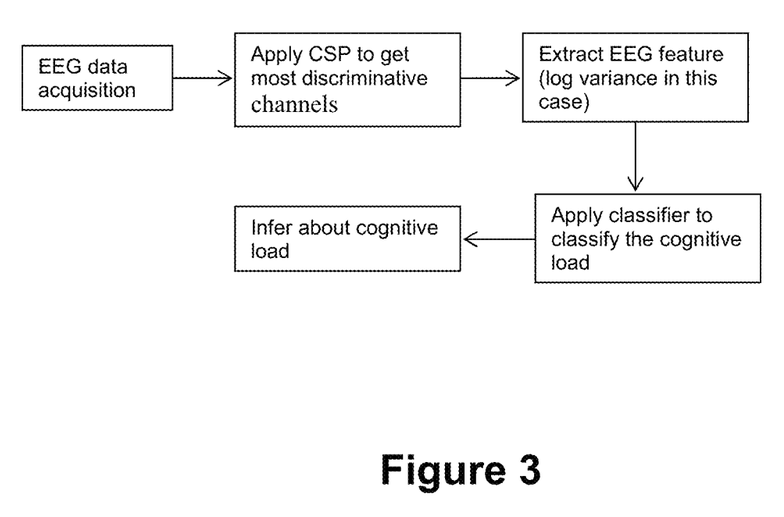
FIG. 3 is a method for validating a dynamic mental operator using an EEG signal, in accordance with an embodiment of the present subject matter.

More details on determination of the first validation score and the second validation score may be provided in the explanation of FIG. 3.

Determining Dynamic Mental Operator

It may be understood that both the onscreen keyboards may be evaluated under two scenarios. In a first scenario, both of the first onscreen keyboard and the second onscreen keyboard may not be assisted with predictive text entry. The user being unassisted with predictive text entry may mean that when the user wishes to enter a word, no suggestions on that word may be provided to the user for selection as and when the user types using a wireless remote. However, in a second scenario, both of the first onscreen keyboard and the second onscreen keyboard may be assisted with predictive text entry. The user being assisted with predictive text entry may mean that when the user wishes to enter a word, one or more suggestions on that word may be provided to the user for selection as and when the user types using a wireless remote.

In the first scenario, the cognitive scores associated with the onscreen keyboards are determined using the values shown in Table 1. Subsequently, the cognitive scores are validated using the EEG signal as explained above. After the cognitive scores are validated, it may be ascertained whether to use the onscreen keyboard or not. More is the cognitive score, more will be the cognitive load, and more uncomfortable the onscreen keyboard will be to use. Therefore, after determining cognitive scores for several onscreen keyboards, one may choose to use an onscreen keyboard with least cognitive score.

However, in the second scenario, the cognitive scores associated with the onscreen keyboards are determined using the values shown in Table 1. Subsequently, the cognitive scores are validated using the EEG signal as explained above. Further, in the second scenario, a new parameter called a dynamic mental operator may also be determined for assisting in the evaluation of the onscreen keyboards. The dynamic mental operator is indicative of an additional cognitive load on the user while the user is assisted with predictive text entry on the onscreen keyboard. In other words, the dynamic mental operator indicates an amount of additional cognitive load which is directly proportional to non-comfort-ness of the user of the onscreen keyboard.

The dynamic mental operator for the first onscreen keyboard and the second onscreen keyboard may be determined by the calculation module 214. In one embodiment, the calculation module 214 may use the KLM-GOMS model to determine the dynamic mental operator for each of the first onscreen keyboard and the second onscreen keyboard. In this embodiment, in order to determine the dynamic mental operator, each of the first set of parameters and the second set of parameters may be arranged one by one in equations similar to equations of the KLM-GOMS model.

The KLM-GOMS equation for traditional text entry of a given phrase for the first onscreen keyboard may be written as:

$$T = T_h + w(k_t T_k + dT_m) \quad (1)$$

Where,
$T_h$=homing time
$T_k$=time for button press
$k_t$=average number of key presses per word
w=number of words typed For predictive text entry, a prediction algorithm reduces the total number of keystrokes. The predictive algorithm in the present embodiment may reduce reduces a number of keystrokes by 0.399. Hence, Effective key-press is $$K_{eff} = wk_t * 0.399 \quad (2)$$

Further, as mentioned above, for predictive text entry the dynamic mental operator comes into play. The dynamic mental operator corresponds to the additional cognitive load on the user for reading and selecting suggestions provided. The suggestions may change with each keystroke.

Thus, equation (1) becomes, $$T = T_h + K_{eff} \cdot T_k + w \cdot d \cdot T_m + K_{eff} \cdot T_{dm} \quad (3)$$

where,

-continued $T_{dm}$ = dynamic mental operator
= time for reading suggestions (dynamic mental (DM) operator) +
 time for one key press to select the word
= $T_{dm(op)} + T_k$ Putting the value of $T_{dm}$ in (3), we get, $$T = T_h + K_{eff} \cdot T_k + w \cdot d \cdot T_m + K_{eff} \cdot T_{dm(op)} + w \cdot T_k \quad (4)$$

For present scenario, one can neglect $T_h$ as it is of no use. Further, $T_k$ is also modified to take into account the search time of a key to be pressed in the onscreen keyboard and $T_s$=time for finding any key and moving focus needs to be considered. Thus equation (4) becomes, $$T = K_{eff}(T_k + t_s) + w \cdot d \cdot T_m + K_{eff} \cdot T_{dm(op)} + w(T_k + \quad (5)$$

In order to calculate the dynamic mental operator, six phrase sets may be selected randomly. Users may be given an initial familiarization phrase and then may be asked to enter six phrases at one go using predictive onscreen keyboard. Time taken by each user and the number of keystrokes required to type the phrase may be recorded. Dynamic mental operator may be calculated by the calculation module 214 using equation (5). From Table 1, one gets, $t_s$=time for finding any key and moving focus=1.77 s
$T_k$=time taken for button press=0.02 s
$T_m$=Mental preparation and thinking time=1.35 s
Values of w, $K_{eff}$ and total time taken for typing are different for different users and are given in table 2 below.

The dynamic mental operator for different users using the first onscreen keyboard is given in table 2 below. The average value of $T_{dm(op)}$ was found to be 0.063.

TABLE 2

Dynamic mental operator for different users

| User | Total time taken to type in sec | Effective key-presses ($K_{eff}$) | No of words typed (w) | $T_{dm(op)}$ in Sec |
|---|---|---|---|---|
| 1 | 228.62 | 65.43 | 30 | 0.0935 |
| 2 | 218.66 | 61.84 | 29 | 0.102 |
| 3 | 237.40 | 72.61 | 30 | 0.010 |
| 4 | 224.28 | 65.43 | 30 | 0.027 |
| 5 | 200.26 | 59.85 | 25 | 0.074 |
| 6 | 206.14 | 61.84 | 26 | 0.0515 |
| 7 | 216.98 | 63.84 | 28 | 0.064 |
| 8 | 224.5 | 65.43 | 30 | 0.035 |
| 9 | 212.52 | 63.04 | 27 | 0.0648 |
| 10 | 215.88 | 63.84 | 28 | 0.049 |

Similarly, the dynamic mental operator may be calculated for users using the second onscreen keyboard. It may be understood that the dynamic mental operator indicates an additional amount of cognitive load which is directly proportional to non-comfort-ness of the user of the onscreen keyboard. In other words, more is the value of the dynamic mental operator, more will be the cognitive load, and more uncomfortable the user will be to use a particular onscreen keyboard. Therefore, it may be understood that the dynamic mental operator may facilitate further evaluation of the onscreen keyboards. Based upon the dynamic mental operator, a layout of an onscreen keyboard may be decided.

Validation Using EEG Signal

Figure 4A:
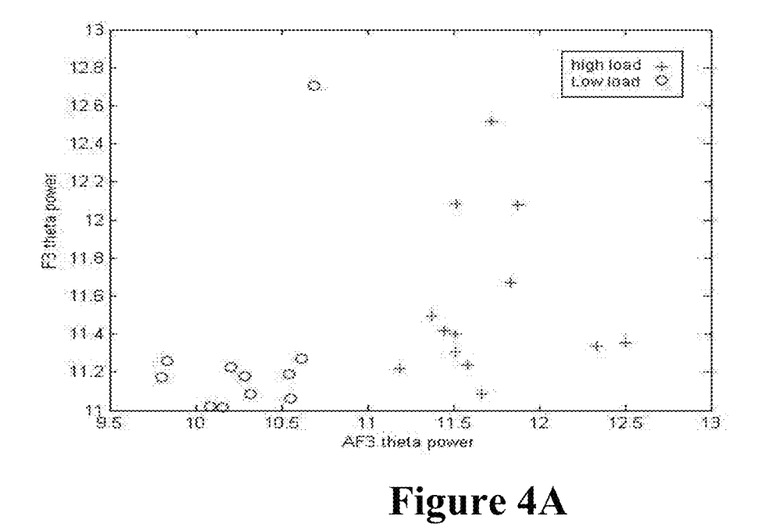
FIGS. 4A, 4B, and 4C show graphs associated with validation of the dynamic mental operator, in accordance with an embodiment of the present subject matter.
Figure 4B:
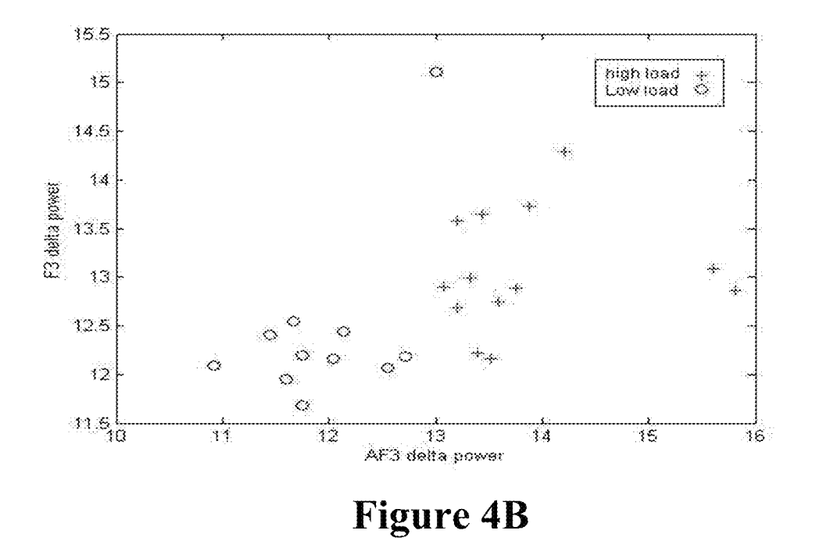
Figure 4C:
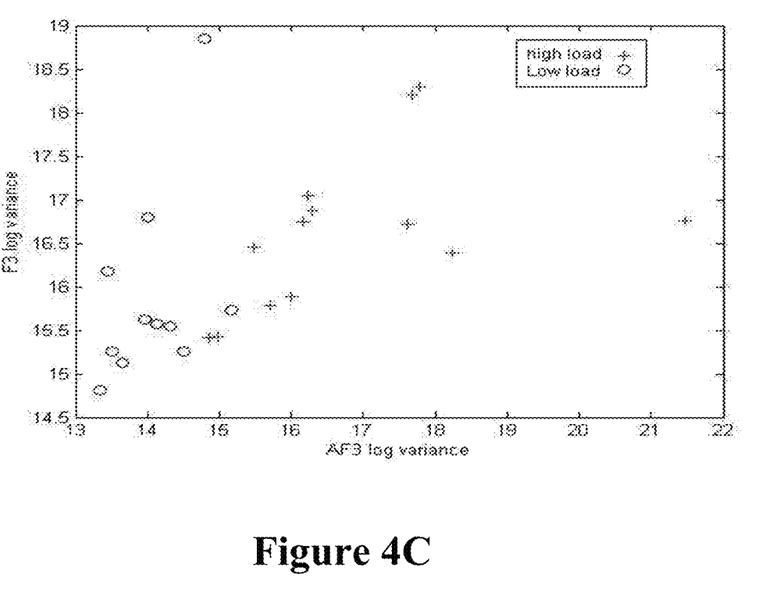

As mentioned above, in order to validate the first cognitive score, the second cognitive score, and the dynamic mental operator (of each of the first onscreen keyboard and of the second onscreen keyboard), the validation module 216 may determine the first validation score, the second validation score, and a validation operator. A method performed by the validation module 216 is shown in FIG. 3. The EEG signal of the user may be captured while the user is using the first onscreen keyboard. After the receiving the EEG signal, the validation module 216 may apply a Common Spatial Pattern (CSP) filter to the EEG signal to obtain a filtered EEG signal. Thereafter, the validation module 216 may extract certain EEG features from the filtered EEG signal using a sliding window approach known in the art. In one example, the EEG features may comprise log variance, HJORTH parameters, frequency band powers, and spectral distributions (See graphs shown in FIGS. 4A, 4B, and 4C). At a further step, the validation module 216 may classify the EEG features using a linear Support Vector Machine (SVM). Thereafter, the validation module 216 may determine the first validation score for the first onscreen keyboard.

Similarly, the validation module 216 may determine a second validation score for the second onscreen keyboard. The different of the first validation score and the second validation score is equal to the validation operator. The validation operator may be compared with the dynamic mental operator, calculated using the KLM-GOMS equations, to determine whether the validation operator is equal to the dynamic mental operator, thereby validating the dynamic mental operator.

It may be understood that the EEG of the signal of the user may be captured in both the first scenario and in the second scenario. In the first scenario, the EEG signal may be captured when both the first onscreen keyboard and the second onscreen keyboard are without predictive text entry. In the second scenario, the EEG signal may be captured when both the first onscreen keyboard and the second onscreen keyboard are assisted with predictive text entry.

Further, it may be understood that the first cognitive score, the second cognitive score, and the validation operator may also be validated using a Stroop effect test, such as a Psychometric test known in the art. Based upon the above explanation, it may be understood that the several onscreen keyboard layouts may be evaluated by using the method and system 102 proposed in the present subject matter. For example, onscreen keyboard layouts having several arrangements of alphabets, characters, and numerals may be evaluated for determining a comfort of the users for one or more of those onscreen keyboard layouts. Based upon the comfort of a user for any particular onscreen keyboard, such a keyboard may be displayed on a display screen of the user for his use.

Figure 5:
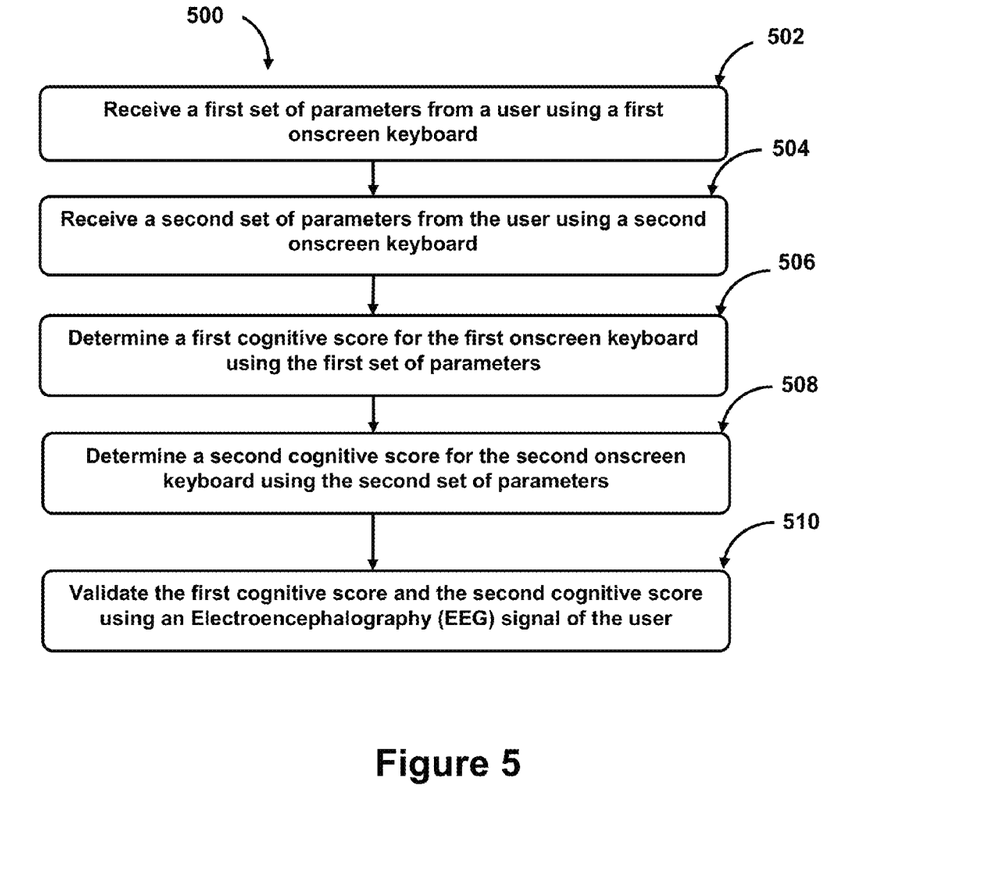
FIG. 5 shows a flowchart illustrating a method for evaluating an onscreen keyboard, in accordance with an embodiment of the present subject matter.

Referring now to FIG. 5, a method 500 for evaluating onscreen keyboards is shown, in accordance with an embodiment of the present subject matter. The method 500 may be described in the general context of computer executable instructions. Generally, computer executable instructions can include routines, programs, objects, components, data structures, procedures, modules, functions, etc., that perform particular functions or implement particular abstract data types. The method 500 may also be practiced in a distributed computing environment where functions are performed by remote processing devices that are linked through a communications network. In a distributed computing environment, computer executable instructions may be located in both local and remote computer storage media, including memory storage devices.

The order in which the method 500 is described is not intended to be construed as a limitation, and any number of the described method blocks can be combined in any order to implement the method 500 or alternate methods. Additionally, individual blocks may be deleted from the method 500 without departing from the spirit and scope of the subject matter described herein. Furthermore, the method can be implemented in any suitable hardware, software, firmware, or combination thereof. However, for ease of explanation, in the embodiments described below, the method 500 may be considered to be implemented in the above described media system 102.

At block 502, a first set of parameters may be received from a user using a first onscreen keyboard. The first set of parameters is indicative of a usability of the first onscreen keyboard. The user uses the first onscreen keyboard via a wireless remote. In one example, the first set of parameters may be received by the receiving module 212.

At block 504, a second set of parameters may be received from a user using a second onscreen keyboard. The second set of parameters is indicative of a usability of the second onscreen keyboard. The user uses the second onscreen keyboard via a wireless remote. In one example, the second set of parameters may be received by the receiving module 212.

At block 506, a first cognitive score for the first onscreen keyboard may be determined using the first set of parameters. In one example, the first cognitive score may be determined by the calculation module 214.

At block 508, a first cognitive score for the first onscreen keyboard may be determined using the first set of parameters. In one example, the first cognitive score may be determined by the calculation module 214.

At block 510, the first cognitive score and the second cognitive score are validated using an Electroencephalography (EEG) signal of the user, The EEG signal of the user is captured while the user is using the first onscreen keyboard and the second onscreen keyboard. In one example, the first cognitive score and the second cognitive score may be validated by the validation module 216.

Although implementations for methods and systems for evaluating onscreen keyboards have been described in language specific to structural features and/or methods, it is to be understood that the appended claims are not necessarily limited to the specific features or methods described. Rather, the specific features and methods are disclosed as examples of implementations for a system and a method for evaluating onscreen keyboards.

What is claimed is:

1. A method for evaluating onscreen keyboards, the method comprising:
receiving, by one or more processors, a first set of parameters from a user using a first onscreen keyboard,
and a second set of parameters from the user using a second onscreen keyboard, wherein the first set of parameters is indicative of a usability of the first onscreen keyboard and the second set of parameters is indicative of a usability of the second onscreen keyboard;
determining, by the one or more processors, a first cognitive score for the first onscreen keyboard using the first set of parameters and a second cognitive score associated with the second onscreen keyboard using the second set of parameters;
determining, by the one or more processors, a first validation score associated with the first onscreen keyboard by capturing the EEG signal while the user is using the first onscreen keyboard, and determining a second validation score associated with the second onscreen keyboard by capturing the EEG signal while the user is using the second onscreen keyboard, wherein determining the first validation score and the second validation score comprises:
applying, by the one or more processors, a Common Spatial Pattern (CSP) filter to the EEG signal to obtain a filtered EEG signal;
extracting, by the one or more processors, EEG features from the filtered EEG signal using a sliding window approach, wherein the EEG features comprise at least one of a log variance, HJORTH parameters, frequency band powers, and spectral distributions;
classifying, by the one or more processors, the EEG features using a linear Support Vector Machine (SVM); and
determining, by the one or more processors, the first validation score and the second validation score based upon the classification respectively;
comparing, by the one or more processors, the first validation score with the first cognitive score to validate the first cognitive score; and
comparing, by the one or more processors, the second validation score with the second cognitive score to validate the second cognitive score.

2. The method of claim 1, wherein each of the first set of parameters and the second set of parameters comprises a pointing parameter P and a time required to move a focus on the key using a wireless remote, wherein the pointing parameter P is indicative of a sum of time required to locate a key on either of the first onscreen keyboard or the second onscreen keyboard.

3. The method of claim 2, wherein the first cognitive score and the second cognitive score are determined using one or more equations associated with a Keystroke Level Model-Goals, Operators, Methods, and Selection (KLM-GOMS) model, wherein the one or more equations associated with the KLM-GOMS model are modified using the pointing parameter P.

4. The method of claim 1, wherein the user is unassisted with predictive text entry while using the first onscreen keyboard and while using the second onscreen keyboard.

5. The method of claim 1, further comprising determining a first cognitive load and a second cognitive load based upon the first cognitive score and the second cognitive score, respectively.

6. The method of claim 1, wherein
the user is using the first onscreen keyboard and the second onscreen keyboard without predictive text entry.

7. The method of claim 1, wherein the user is assisted with predictive text entry while using the first onscreen keyboard and while using the second onscreen keyboard.

8. The method of claim 7, further comprising determining a dynamic mental operator when the user is assisted with predictive text entry.

9. The method of claim 8, wherein the dynamic mental operator is determined using one or more equations associated with a Keystroke Level Model-Goals, Operators, Methods, and Selection (KLM-GOMS) model, wherein the one or more equations associated with the KLM-GOMS model are modified using a pointing parameter P.

10. The method of claim 1, further comprising:
determining a dynamic mental operator when the user is assisted with predictive text entry while using the first onscreen keyboard and while using the second onscreen keyboard; and
validating the dynamic mental operator.

11. The method of claim 10, wherein validating the dynamic mental operator comprises:
determining a difference between the first validation score and the second validation score to generate a validation operator; and comparing the validation operator with the dynamic mental operator to determine whether the validation operator is same as the dynamic mental operator, thereby validating the dynamic mental operator.

12. A system for evaluating onscreen keyboards, the system comprising:
one or more hardware processors; and
one or more memory units storing machine readable instructions executable by the one or more processors for:
receiving a first set of parameters from a user using a first onscreen keyboard,
and receiving a second set of parameters from the user using a second onscreen keyboard, wherein the first set of parameters is indicative of a usability of the first onscreen keyboard and the second set of parameters is indicative of a usability of the second onscreen keyboard;
determining a first cognitive score for the first onscreen keyboard using the first set of parameters and a second cognitive score associated with the second onscreen keyboard using the second set of parameters;
determining, by the one or more processors, a first validation score associated with the first onscreen keyboard by capturing the EEG signal while the user is using the first onscreen keyboard, and determining a second validation score associated with the second onscreen keyboard by capturing the EEG signal while the user is using the second onscreen keyboard, wherein determining the first validation score and the second validation score comprises:
applying, by the one or more processors, a Common Spatial Pattern (CSP) filter to the EEG signal to obtain a filtered EEG signal;
extracting by the one or more processors, EEG features from the filtered EEG signal using a sliding window approach, wherein the EEG features comprise at least one of a log variance, HJORTH parameters, frequency band powers, and spectral distributions;
classifying, by the one or more processors, the EEG features using a linear Support Vector Machine (SVM); and
determining, by the one or more processors, the first validation score and the second validation score based upon the classification respectively;
comparing, by the one or more processors, the first validation score with the first cognitive score to validate the first cognitive score; and
comparing, by the one or more processors, the second validation score with the second cognitive score to validate the second cognitive score.

13. The system of claim 12, wherein
the user is using the first onscreen keyboard and the second onscreen keyboard without predictive text entry.

14. The system of claim 12, wherein the one or more processors executes instructions for:
determining a dynamic mental operator when the user is assisted with predictive text entry while using the first onscreen keyboard and while using the second onscreen keyboard; and
validating the dynamic mental operator.

15. The system of claim 14, wherein the one or more processors executes instructions for validating the dynamic mental operator by:
determining a difference between the first validation score and the second validation score to generate a validation operator; and
comparing the validation operator with the dynamic mental operator to determine whether the validation operator is same as the dynamic mental operator.

16. A non-transitory computer readable medium storing machine readable instructions executable by one or more processors for:
receiving a first set of parameters from a user using a first onscreen keyboard
and a second set of parameters from the user using a second onscreen keyboard, wherein the first set of parameters is indicative of a usability of the first onscreen keyboard and the second set of parameters is indicative of a usability of the second onscreen keyboard;
determining a first cognitive score for the first onscreen keyboard using the first set of parameters and
a second cognitive score associated with the second onscreen keyboard using the second set of parameters;
determining a first validation score associated with the first onscreen keyboard by capturing the EEG signal while the user is using the first onscreen keyboard, and determining a second validation score associated with the second onscreen keyboard by capturing the EEG signal while the user is using the second onscreen keyboard, wherein determining the first validation score and the second validation score comprises,
applying a Common Spatial Pattern (CSP) filter to the EEG signal to obtain a filtered EEG signal;
extracting EEG features from the filtered EEG signal using a sliding window approach, wherein the EEG features comprise at least one of a log variance, HJORTH parameters, frequency band powers, and spectral distributions;
classifying the EEG features using a linear Support Vector Machine (SVM); and
determining the first validation score and the second validation score based upon the classification respectively;
comparing the first validation score with the first cognitive score to validate the first cognitive score; and
comparing the second validation score with the second cognitive score to validate the second cognitive score.

* * * * *